United States Patent
Hall et al.

(10) Patent No.: US 10,787,564 B2
(45) Date of Patent: Sep. 29, 2020

(54) POLYETHYLENE COMPOSITIONS AND ARTICLES MANUFACTURED THEREFROM

(71) Applicant: ExxonMobil Chemical Patents Inc., Baytown, TX (US)

(72) Inventors: Gregory K. Hall, Humble, TX (US); Stefan B. Ohlsson, Keerbergen (BE); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 51 days.

(21) Appl. No.: 16/209,686

(22) Filed: Dec. 4, 2018

(65) Prior Publication Data

US 2019/0211192 A1    Jul. 11, 2019

Related U.S. Application Data

(60) Provisional application No. 62/616,020, filed on Jan. 11, 2018.

(51) Int. Cl.
| | | |
|---|---|---|
| *C08L 23/06* | (2006.01) | |
| *C08L 23/08* | (2006.01) | |
| *C08L 45/00* | (2006.01) | |

(52) U.S. Cl.
CPC ........... *C08L 23/06* (2013.01); *C08L 23/0815* (2013.01); *C08L 23/0823* (2013.01); *C08L 45/00* (2013.01); *C08L 2203/16* (2013.01); *C08L 2203/30* (2013.01); *C08L 2207/066* (2013.01)

(58) Field of Classification Search
CPC ...... C08L 23/0815; C08L 45/00; C08L 23/06; C08L 23/0823; C08L 2207/066; C08L 2203/30; C08L 2203/16; C08J 5/18; C08J 2409/00; C08J 2445/00; C08J 2323/08
See application file for complete search history.

(56) References Cited

U.S. PATENT DOCUMENTS

| | | | |
|---|---|---|---|
| 5,837,787 A | 11/1998 | Harrington | |
| 6,872,462 B2 | 3/2005 | Roberts et al. | |
| 7,179,521 B2 | 2/2007 | Arthurs et al. | |
| 7,727,620 B2 | 6/2010 | Yamada et al. | |
| 7,935,401 B2 | 5/2011 | Opuszko et al. | |
| 9,452,593 B2 | 9/2016 | Tatarka et al. | |
| 9,475,567 B1* | 10/2016 | Roach | B64B 1/58 |
| 10,005,262 B2 | 6/2018 | Hu et al. | |
| 2004/0010098 A1* | 1/2004 | Groos et al. | B01F 5/0473 526/64 |
| 2004/0234800 A1 | 11/2004 | Arthurs et al. | |
| 2006/0159878 A1 | 7/2006 | Wakai et al. | |
| 2009/0197022 A1* | 8/2009 | Lu et al. | B05D 7/04 428/29 |
| 2014/0134430 A1* | 5/2014 | Mitchell et al. | G09F 3/10 428/354 |
| 2015/0010741 A1 | 1/2015 | Pham et al. | |
| 2017/0233516 A1 | 8/2017 | Yang et al. | |
| 2017/0283116 A1 | 10/2017 | Mitchell et al. | |
| 2018/0371207 A1* | 12/2018 | DeWulf et al. | C08K 3/34 |

FOREIGN PATENT DOCUMENTS

| | | |
|---|---|---|
| JP | 6135893 | 5/2017 |
| WO | 2001-0118112 | 3/2001 |
| WO | 2014/141820 | 9/2014 |

OTHER PUBLICATIONS

Jester, "Heat Seal Characteristics of Cyclic Olefin Copolymer/Polyethylene Blends," in TAPPI 2002 Place Conference, Boston, Massachusetts (2002).
Constant, "Cyclic Olefinic Copolymers as Non-Migrating Polymeric Slip Additives in LDPE Cast Films," in ANTEC 2002 Conference, San Francisco, California (2002).
Jester, "Cyclic-Olefin Copolymer—A High Performance Modifier for Conventional Polyolefins," in SPE International Polyolefins Conference, Houston, Texas (Feb. 25, 2007).
Tatarka, "Improved Properties and Cost Efficiencies of Cyclic Olefin Copolymer Enhanced Forming Films," SPE Annual Technical Conference (May 7, 2007).
Tatarka, "Polyolefin Film Enhancement Using Cyclic Olefin Copolymers for Retort Applications," in SPE Polyolefin & Flexpack Conference, Feb. 25, 2008.
Tatarka, "Thermoforming Enhancement With Cyclic Olefin Copolymers," in SPE International Polyolefins Conference, Houston, Texas (Feb. 22, 2009).
Blochowiak, M. (2006) "Structure and Properties of Norbornene-Ethylene Copolymers," Ma Planck Inst. for Poly. Res., Mainz, Germany, 127 pages.
Jester, "High Aroma Barrier Combined with Low Extractables," in 2005 Place Conference, Las Vegas, Nevada (Sep. 27, 2005).
Aubee et al., "Blending of Cyclic Olefins in Single Site LLDPE (sLLDPE) for Improved Bubble Stability and Output Rates on Blow Film Extrusion Process," in SPE International Polyolefins Conference, Houston, Texas (Feb. 22, 2009).
Jester, "COC Enhanced Polyolefin Films for Shrink Sleeves and Labels," in AWA International Sleeve & Label Conference, Chicago, Illinois (2010).
Lamonte et al., "Uses and Processing of Cyclic Olefin Copolymers," 2000 Thermoforming Conference, Plastics Engineering, 2000, pp. 51-55.

\* cited by examiner

*Primary Examiner* — Nathan M Nutter
(74) *Attorney, Agent, or Firm* — Catherine L. Bell

(57) ABSTRACT

Described is a polyethylene composition comprising at least one polyethylene having a crystallinity of less than 60, or 55, or 50% and within a range from 0.2 wt % to 15 wt % of cyclic-olefin copolymer and within a range from 0.2 wt % to 15 wt % of hydrocarbon resin, by weight of the polyethylene composition. The polyethylene compositions can be formed into useful articles such as films and injection molded and thermoformed articles.

20 Claims, No Drawings

POLYETHYLENE COMPOSITIONS AND ARTICLES MANUFACTURED THEREFROM

CROSS REFERENCE TO RELATED APPLICATIONS

This application claims priority to and the benefit of U.S. Ser. No. 62/616,020, filed Jan. 11, 2018, and is incorporated by reference in its entirety.

FIELD OF THE INVENTION

The present invention relates to polyethylene compositions and articles that comprise such compositions, and in particular to articles comprising a blend of polyethylene and cyclic-olefin copolymers that are compatibilized with a hydrocarbon resin.

BACKGROUND

Polyethylenes, especially metallocene-produced polyethylenes, have been used in numerous film applications such as packaging, collation shrink, shrink sleeves, blister packs, stand-up pouches, for lamination of articles, and others. There is a desire to improve certain mechanical properties of such films, and it has been proposed to add cyclic-olefin copolymers (COC's) to such polyethylene films to boost the film's stiffness, barrier properties, and shrink properties. However, it has been found that a thicker film is often necessary in such blends in order to provide the necessary functional barrier or shrink properties, while maintaining mechanical properties (i.e. stiffness, toughness, tear, etc.). Also, the optical clarity of such blends in films is often compromised due to incompatibility between the COC and base polyethylene resins. What is needed is a way to improve certain properties of polyethylene/COC-blend films without losing other desirable qualities.

Publications of interest include U.S. Pat. Nos. 7,727,620; 7,179,521; 6,872,462; 10,005,262; 9,452,593; 7,935,401; U.S. Publication Nos. 2015/010741; 2006/159878; and PCT Publication No. WO 2014/141820. Other publications of interest include:

Randy Jester, "Heat Seal Characteristics of Cyclic Olefin Copolymer/Polyethylene Blends," in TAPPI 2002 PLACE CONFERENCE, Boston, Mass. (2002);

David R. Constant, "Cyclic Olefinic Copolymers as Non-Migrating Polymeric Slip Additives in LDPE Cast Films," in ANTEC 2002 CONFERENCE, San Francisco, Calif. (2002);

Ronald R. Lamonte, "Stiffer, Thinner, Packaging Films with Improved Sealing Using Cyclic Olefin Copolymers," in FLEXPAC CONFERENCE, Amsterdam, Holland (November 2000);

Randy Jester, "High Aroma Barrier Combined with Low Extractables," in 2005 PLACE CONFERENCE, Las Vegas, Nev. (Sep. 27, 2005);

Randy Jester, "Cyclic-Olefin Copolymer—A High Performance Modifier for Conventional Polyolefins," in SPE INTERNATIONAL POLYOLEFINS CONFERENCE, Houston, Tex. (Feb. 25, 2007);

Paul D. Tatarka, "Improved Properties and Cost Efficiencies of Cyclic Olefin Copolymer Enhanced Forming Films," SPE ANNUAL TECHNICAL CONFERENCE (May 7, 2007);

Paul D. Tatarka, "Polyolefin Film Enhancement Using Cyclic Olefin Copolymers for Retort Applications," in SPE POLYOLEFIN & FLEXPACK CONFERENCE, Feb. 25, 2008;

Paul D. Tatarka, "Thermoforming Enhancement With Cyclic Olefin Copolymers," in SPE INTERNATIONAL POLYOLEFINS CONFERENCE, Houston, Tex. (Feb. 22, 2009);

Norman Aubee & Timothy Kneale, "Blending of Cyclic Olefins in Single Site LLDPE (sLLDPE) for Improved Bubble Stability and Output Rates on Blow Film Extrusion Process," in SPE INTERNATIONAL POLYOLEFINS CONFERENCE, Houston, Tex. (Feb. 22, 2009); and Randy Jester, "COC Enhanced Polyolefin Films for Shrink Sleeves and Labels," in AWA INTERNATIONAL SLEEVE & LABEL CONFERENCE, Chicago, Ill. (2010).

SUMMARY

Described is a polyethylene composition comprising (or consisting of, or consisting essentially of) at least one polyethylene having a crystallinity of less than 60, or 55, or 50% and within a range from 0.2 wt % to 15 wt % of cyclic-olefin copolymer and within a range from 0.2 wt % to 15 wt % of hydrocarbon resin, by weight of the polyethylene composition, or "composition".

Also described are films and articles such as injection molded and thermoformed articles comprising (or consisting of, or consisting essentially of) the polyethylene compositions described herein.

DETAILED DESCRIPTION

It has been found that combining a relatively low molecular weight hydrocarbon resin such as a dicyclopentadienyl resin (DCPD) and a relatively high molecular weight COC (e.g., ethylene-norbornene copolymers) to polyethylene can improve the compatibility, processing, and performance characteristics of the composition. DCPD and COC can be pre-compounded to form a masterbatch or can be dry or melt blended directly into polyethylene film resin formulations (depending on the application) to produce novel films with superior performance. It is particularly advantageous to blend the DCPD/COC combination into polyethylene formulations having a higher degree of amorphous regions (i.e., lower crystallinity).

Thus provided is a composition comprising at least one polyethylene having a crystallinity of less than 60, or 55, or 50% and within a range from 0.2 wt % to 15 wt % of cyclic-olefin copolymer and within a range from 0.2 wt % to 15 wt % of hydrocarbon resin, by weight of the composition. The "percent crystallinity" is determined by a differential scanning calorimetry (DSC) measurement and calculation described below.

As used herein, "polyethylene" is any type of homo- or co-polymer derived from ethylene and $C_3$ to $C_{10}$ α-olefins, most preferably comprising at least 80, or 85, or 90, or 95 wt % ethylene derived units (meaning that the polymer itself comprises the named amount of "mer" units that come from ethylene). When referring to "at least one polyethylene" or "polyethylene," this includes the possibility of having a blend of two or more polymers fitting that description. Preferably, the polyethylene is a linear low density polyethylene having a density of 0.93, or 0.92 g/cm$^3$ or less, or within the range from 0.88 or 0.89 or 0.90 g/cm$^3$ to 0.915 or 0.925 or 0.930 g/cm$^3$. Also, the linear low density polyethylene preferably has a melt index (ASTM D 1238 190° C., 2.16 kg) within the range from 0.20 or 0.40 or 0.60 or 0.80 g/10 min to 1.20 or 1.40 or 1.60 or 2.00 or 4.00, or 8.0, or 10.0 g/10 min. In any embodiment, the polyethylene has a molecular weight distribution (Mw/Mn) within the range from 1.8 to 2.0 or 2.5 or 4.0 or 3.5 or 4.0. Most preferably, the polyethylenes described herein are produced using a single-site catalyst such as a metallocene-type catalyst.

Density can be determined according to ASTM D1505-10. Compression molded samples for density measurements are made according to ASTM D4703-10a. Samples are conditioned by 40 hours conditioning of the density molded specimens (typically made from pellet samples) at 23° C. before density measurement.

As stated above, in any embodiment the polyethylene useful herein has a crystallinity of less than 60, or 55, or 50%, or within a range from 30, or 35, or 40% to 50, or 55, or 60% as determined by DSC, described below.

As used herein, a "cyclic-olefin copolymer" (COC) is a copolymer comprising 50 wt % or more ethylene derived units, the remainder being cyclic olefin derived units selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin derived unit is selected from C5, or C6 to C8, or C10, or C12, or C20 cyclic-olefin derived units, and more preferably bicyclic olefin derived units which are cyclic olefins containing a bridging hydrocarbon moiety that forms two rings in the overall structure such as in bicyclo-(2,3,1)-heptene-2 (norbornenes). Most preferably, the cyclic olefin derived units are selected from norbornenes, tetracyclododecene, and substituted versions thereof.

The COC's useful herein may have most any level of cyclic olefin derived units such as within a range from 0.5, or 2, or 10 wt % to 80, or 90, or 95 wt % by weight of the COC. In any embodiment, the cyclic olefin content (cyclic olefin derived units) of the COC's useful herein is 50, or 60, or 65, or 70 wt % or more, or within a range from 50, or 55, or 60, or 65, or 70 wt % to 80, or 85, or 90, or 95 wt %, by weight of the COC.

The COC's can be made by any suitable polymerization means. In any embodiment, the cyclic olefin monomer that is combined with ethylene monomers in the polymerization process is selected from C5 to C8, or C12, or C16, or C20 olefins comprising at least one C5 to C8 cyclic structure, such as, for example, bicyclo compounds such as bicyclo-(2,3,1)-heptene-2. Preferably, the cyclic olefin is selected from C5, or C6 to C8, or C10, or C12, or C20 cyclic olefins, and more preferably bicyclic olefins which are cyclic olefins containing a bridging hydrocarbon moiety that forms two rings in the overall structure such as in bicyclo-(2,3,1)-heptene-2 (norbornenes). Most preferably, the cyclic olefins used to make the COC's are selected from norbornenes, tetracyclododecene, and substituted versions thereof. In order to effect the polymerization process upon combining, as well as combining at a desirable temperature, the components are preferably combined at a pressure of at least 0.8, or 1, or 2, or 3 MPa; or within a range from 0.8, or 1, or 2, or 3 MPa to 4, or 6, or 8, or 10 MPa. This pressure can come from the addition of the ethylene and/or other gases in the polymerization reactor, and is of course influenced by the temperature of the reactor. The level of ethylene and cyclic olefin is adjusted to obtain the desired catalytic activity as well as desired level of cyclic olefin comonomer incorporation into the polyethylenes described herein. In any embodiment, the combining of the monomers with catalyst can take place at a reaction temperature, the average temperature within the vessel or reactor used to combine the components to effect polymerization, within a range from 80, or 85, or 90, or 100° C. to 120, or 130, or 140, or 150° C.

In any embodiment, the COC has a glass transition temperature ($T_g$) of at least 70, or 80, or 90° C., or within a range from 70, or 80, or 90° C. to 140, or 150, or 160° C.

In any embodiment, the COC has a weight average molecular weight (Mw) of greater than 60,000, or 80,000, or 100,000, or 200,000, or 300,000 g/mole, or within a range from 60,000, or 80,000, or 100,000, or 200,000 g/mole to 300,000, or 400,000, or 500,000, or 600,000 g/mole. In any embodiment the COC has a number average molecular weight (Mn) of greater than 30,000, or 40,000, or 50,000, or 60,000, or 80,000 g/mole, or within a range from 30,000, or 40,000, or 50,000, or 60,000, or 80,000 g/mole to 100,000, or 200,000 g/mole.

Exemplary commercial COC's include Topas™ 5013F-04, Topas™ 8007F-600, and Topas™ 9506 F-500 COC resins (from Topas™ Advanced Polymers Inc.)

As used herein, a "hydrocarbon resin" is a polymer or oligomer produced by the polymerization of cyclopentadiene (CPD) or substituted CPD, which may further include aliphatic or aromatic monomers as described herein. In any embodiment, the aliphatic and/or aromatic monomers may include heteroatoms or heteroatom-containing moieties such as hydroxide, ethers, esters, carboxylates, amines, and/or imines Most preferably, any heteroatoms or heteroatom-containing moieties are absent from the hydrocarbon resins described herein.

In any embodiment the hydrocarbon resin is a non-aromatic resin or an aromatic resin. Preferably, the hydrocarbon resin has an aromatic content within a range from 0 wt % and 60 wt %, or within a range from 1 wt % and 60 wt %, or within a range from 1 wt % and 40 wt %, or within a range from 1 wt % and 20 wt %, or within a range from 10 wt % and 20 wt %. Alternatively or additionally, the hydrocarbon resin may have an aromatic content within a range from 15 wt % and 20 wt %, or within a range from 1 wt % and 10 wt %, or within a range from 5 wt % and 10 wt %. Preferred aromatics that may be in the hydrocarbon resin include one or more of styrene, indene, derivatives of styrene, and derivatives of indene. Particularly preferred aromatic olefins include styrene, alpha-methylstyrene, beta-methylstyrene, indene, and methylindenes, and vinyl toluenes. Styrenic components include styrene, derivatives of styrene, and substituted styrenes. In any embodiment, styrenic components do not include fused-rings, such as indenes or indenyl groups.

In any embodiment, suitable hydrocarbon resins may comprise hydrocarbon resins produced by the catalytic (cationic) polymerization of linear dienes. Such monomers are primarily derived from Steam Cracked Naphtha (SCN) and include C5 dienes such as piperylene (also known as 1,3-pentadiene). Polymerizable aromatic monomers can also be used to produce resins and may be relatively pure, for example, styrene, methylstyrene, or from a C9 aromatic SCN stream. Such aromatic monomers can be used alone or in combination with the linear dienes previously described. "Natural" monomers can also be used to produce resins, for example, terpenes such as alpha-pinene or beta-carene, either used alone or in high or low concentrations with other polymerizable monomers. Typical catalysts used to make these resins are $AlCl_3$ and $BF_3$, either alone or complexed. Mono-olefin modifiers such as 2-methyl-2-butene may also be used to control the molecular weight distribution (Mw/Mn) of the final resin. The final resin may be partially or totally hydrogenated.

In any embodiment, suitable hydrocarbon resins may be at least partially hydrogenated or substantially hydrogenated. As used herein, "at least partially hydrogenated"

means that the material contains less than 90% olefinic protons, or less than 75% olefinic protons, or less than 50% olefinic protons, or less than 40% olefinic protons, or less than 25% olefinic protons, such as from 20% to 50% olefinic protons. As used herein, "substantially hydrogenated" means that the material contains less than 5% olefinic protons, or less than 4% olefinic protons, or less than 3% olefinic protons, or less than 2% olefinic protons, such as from 1% to 5% olefinic protons. The degree of hydrogenation is typically conducted so as to minimize and avoid hydrogenation of any aromatic bonds.

In any embodiment, suitable hydrocarbon resins may comprise one or more oligomers such as dimers, trimers, tetramers, pentamers, and hexamers. The oligomers may be derived from a petroleum distillate boiling in the range of 30° C. to 210° C. The oligomers may be derived from any suitable process and are often derived as a byproduct of resin polymerization. Suitable oligomer streams may have a number average molecular weight (Mn) within a range from 130, or 200 g/mole to 270, or 320, or 410, or 500 g/mole. Examples of suitable oligomer streams include, but are not limited to, oligomers of cyclopentadiene and substituted cyclopentadiene, oligomers of C4 to C6 conjugated diolefins, oligomers of C8 to C10 aromatic olefins, and combinations thereof. Other monomers may be present. These include C4 to C6 mono-olefins and terpenes. The oligomers may comprise one or more aromatic monomers and may be at least partially hydrogenated or substantially hydrogenated.

Preferably, suitable hydrocarbon resins comprises a dicyclopentadiene, cyclopentadiene, and methylcyclopentadiene derived content of 60 wt % to 100 wt % of the total weight of the hydrocarbon resin, or DCPD resins. In any embodiment, suitable hydrocarbon resins may have a dicyclopentadiene, cyclopentadiene, and methylcyclopentadiene derived content of 70 wt % to 95 wt %, or 80 wt % to 90 wt %, or 95 wt % to 99 wt % of the total weight of the hydrocarbon resin. Preferably, the hydrocarbon resin may be a hydrocarbon resin that includes, in predominant part, dicyclopentadiene derived units. The term "dicyclopentadiene derived units", "dicyclopentadiene derived content", and the like refers to the dicyclopentadiene monomer used to form the polymer, that is, the unreacted chemical compound in the form prior to polymerization, and can also refer to the monomer after it has been incorporated into the polymer, which by virtue of the polymerization reaction typically has fewer hydrogen atoms than it does prior to the polymerization reaction.

In any embodiment, suitable hydrocarbon resins may have a dicyclopentadiene derived content of 50 wt % to 100 wt % of the total weight of the hydrocarbon resin, more preferably 60 wt % to 100 wt % of the total weight of the hydrocarbon resin, even more preferably 70 wt % to 100 wt % of the total weight of the hydrocarbon resin. Accordingly, in any embodiment, suitable hydrocarbon resins may have a dicyclopentadiene derived content of 50% or more, or 60% or more, or 70% or more, or 75% or more, or 90% or more, or 95% or more, or 99% or more of the total weight of the hydrocarbon resin.

Suitable hydrocarbon resins may include up to 5 wt % indenic components, or up to 10 wt % indenic components. Indenic components include indene and derivatives of indene. Often, the hydrocarbon resin includes up to 15 wt % indenic components. Alternatively, the hydrocarbon resin is substantially free of indenic components.

Preferred hydrocarbon resins have a melt viscosity of from 300 to 800 centipoise (cPs) at 160° C., or more preferably of from 350 to 650 cPs at 160° C. Preferably, the melt viscosity of the hydrocarbon resin is from 375 to 615 cPs at 160° C., or from 475 to 600 cPs at 160° C. The melt viscosity may be measured by a Brookfield viscometer with a type "J" spindle according to ASTM D6267.

Suitable hydrocarbon resins have an Mw greater than 600 g/mole or greater than 1000 g/mole. In any embodiment, the hydrocarbon resin may have a weight average molecular weight (Mw) of from 600, or 800 g/mole to 1000, or 1200, or 1400, or 1600, or 2000 g/mole. Suitable hydrocarbon resins may have an Mn of from 300, or 400, or 500 g/mole to 600, or 700, or 800 g/mole. Suitable hydrocarbon resins may have a z-average molecular weight (Mz) of from 1200, or 1250, or 1500 g/mole to 2000, or 2500, or 3000, or 3500 g/mole, but preferably the Mz is less than 2500, or 2000 g/mole. In any embodiment, suitable hydrocarbon resins may have an Mw/Mn of 4 or less, preferably from 1.3 to 1.7, or 1.8, or 2.

Preferred hydrocarbon resins have a glass transition temperature ($T_g$) within a range from 0, or 30, or 40, or 50° C. to 60, or 80, or 100, or 140, or 160, or 180, or 200° C.

Preferably, the hydrocarbon resin has a total dicyclopentadiene, cyclopentadiene, and methylcyclopentadiene derived content of from 60 wt % to 100 wt % of the total weight of the hydrocarbon resin and wherein the hydrocarbon resin has a weight average molecular weight of from 600 g/mole to 2000 g/mole.

Specific examples of commercially available hydrocarbon resins include Escorez™ and Oppera™ tackifying and hydrocarbon resins available from ExxonMobil Chemical Company, Arkon™ M90, M100, M115 and M135 and Super Ester™ rosin esters available from Arakawa Chemical Company of Japan, Sylvares™ phenol modified styrene- and methylstyrene resins, styrenated terpene resins from Kraton Corporation, Zonatac™ terpene-aromatic resins, and terpene phenolic resins available from Arizona Chemical Company, Sylvatac™ and Sylvalite™ rosin esters available from Arizona Chemical Company, Norsolene™ aliphatic aromatic resins available from Cray Valley of France, Dertophene™ terpene phenolic resins available from DRT Chemical Company of Landes, France, Eastotac™ resins, Piccotac™ C5/C9 resins, Regalite™ and Regalrez™ aromatic and Regalite™ cycloaliphatic/aromatic resins available from Eastman Chemical Company of Kingsport, Tenn., Wingtack™ ET and Extra™ available from Goodyear Chemical Company, Foral™, Pentalyn™, and Permalyn™ rosins and rosin esters available from Hercules (now Eastman Chemical Company), Quintone™ acid modified C5 resins, C5/C9 resins, and acid modified C5/C9 resins available from Nippon Zeon of Japan, and LX™ mixed aromatic/cycloaliphatic resins available from Neville Chemical Company, and hydrogenated cyclopentadiene-based resins available from Dow Chemical Company. The preceding examples are illustrative only and by no means limiting.

Generally, the inventive compositions described herein find use in making films and many molded and thermoformed articles such as pipes, automotive components, construction components, electronic devices, medical equipment, sports equipment, food containers, appliances, and other domestic and commercial uses. Similarly, the polyethylenes can find use thermoformed articles made from injection molding, blow molding, and rotational molding processes.

As used herein a "film" or "multi-layered film" is a material that has an average thickness of less than or equal to 0.25 mm and may include one or more substances such as polymers, fillers, additives, oils, etc., and preferably is continuous within its measurable width and length, typically is flexible, and preferably has a thickness within a range from 2, or 10, or 20, or 40, or 45 µm to 50, or 100, or 150, or 200, or 250 µm. Most preferably, the films described herein, which can also make up one or more layers of a multi-layered film having two or more of the same or different layers of materials, have a thickness within a range from 30, or 40, or 45 µm to 50, or 55, or 60, or 100 µm. The term "film" also includes coatings, such as when the film is extruded onto a surface such as a metal, glass, another polymer, or other stiff or flexible surface. In any embodiment, the multi-layered films described herein are so called shrink films. Desirably, the inventive multi-layered films may be at least 5, or 10, or 20% thinner than the same film without the COC, as described herein.

A preferred process to form the films described herein is in a blown film process. In a typical blown film process, a polyethylene melt is extruded through a die such as an annular slit die, usually vertically, to form a thin walled tube. Preferably, the die used in the formation of the films herein is designed such that the die opening, through which the molten polyethylene emanates, is in the form of a ring and the molten polyethylene emanating therefrom is in the form of a continuous tube. Cooling, preferably in the form of air, is introduced via a ring in the center of the die to blow up the tube like a balloon. Cooling could also be effectuated by other means, and the air may be nitrogen/oxygen or other gases or mixtures of gases or liquids. Mounted on top of the die, a high-speed air ring blows onto the hot film to cool it. The tube of film can then continue upwards away from the die, continually cooling, until it may pass through nip rolls where the tube is flattened to create what is known as a "lay-flat" tube of film. This lay-flat or collapsed tube can then be taken back down the extrusion "tower" via more rollers. In any embodiment, the air inside the bubble is also exchanged, known as "Internal Bubble Cooling" (IBC).

In any case, the lay-flat film is then either kept as such or the edges of the lay-flat are slit off to produce two flat film sheets and wound up onto reels. Articles, such as bags, can be made from such lay-flat films. In this regard, if kept as lay-flat, the tube of film is made into bags by sealing across the width of film and cutting or perforating to make each bag. This is done either in line with the blown film process or at a later stage.

Preferably, the expansion ratio between die and blown tube of film would be 1.1, or 1.2 to 2, or 3, or 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

A typical blown film process can be used where the ingredients used to form the film are added in any desirable form, preferably as granules to a hopper, which feeds the material to the extruder, where the materials are melt blended at a desirable temperature through shear forces and/or heating. Common "additives," such as antioxidants, may be added either as a solid to the hopper, or in the form of a masterbatch, wherein the one or more additives is incorporated into a polymeric or waxy pellet. The molten material is then fed, with or without filtering, to a die which is also heated to a desired temperature and then forced from the die. The cooling of the forming film takes place preferably via a device that blows air that is at least 10 or 20° C. cooler than the surrounding air. The air preferably blows against the outside of the film, most preferably around the entire circumference formed by the film. There is also air blown internally that both cools and blows the film up like a balloon. The film starts to expand where it eventually cools and crystallizes to form finished film. The air blowing device can be adjusted up or down, away from the die, to allow the molten, heated tube of polymer to crystalize on its own (under room temperature such as 20° C.) before being cooled further.

The films have certain processing advantages. In any embodiment, the at least one core layer of the multi-layered films extrudes at a melt temperature at the die (measured using a thermocouple in the melt) of 238, or 240° C. or less, or within a range from 210, or 215, or 220, or 225, or 230° C. to 238, or 240, or 245, or 250° C. In any embodiment, the at least one core layer of the multi-layered films extrudes at a melt pressure of 45, or 42 MPa or less, or within a range from 30, or 35, or 38 MPa to 42, or 45, or 50 MPa. These melt temperatures and melt pressures are preferably obtained with a die factor within a range from 0.6 to 1 kg/mm die 4, and/or a specific output within a range from 2.8 to 3.2 kg/h/rev. The die factor is expressed in kg/mm-hr, the full expression is kg/die diameter (in unit of mm)/hr.

The polyethylene compositions can also be thermoformed to make useful articles. Thermoforming is a manufacturing process where the polyethylene sheet is heated to a pliable forming temperature, formed to a specific shape in a mold, and trimmed to create a usable product. The sheet, or "film" when referring to thinner gauges and certain material types, is heated in an oven to a high-enough temperature that permits it to be stretched into or onto a mold and cooled to a finished shape. Its simplified version is vacuum forming. The compositions described herein can desirably be formed into films or sheets suitable for thermoforming processes.

In any embodiment, a small tabletop or lab size machine can be used to heat small cut sections of polyethylene sheet and stretch it over a mold using vacuum. This method is often used for sample and prototype parts. In complex and high-volume applications, very large production machines can be utilized to heat and form the polyethylene sheet and trim the formed parts from the sheet in a continuous high-speed process, and can produce many thousands of finished parts per hour depending on the machine and mold size and the size of the parts being formed. The compositions described herein are suitable for both types of thermoforming.

One desirable type of thermoforming is thin-gauge thermoforming. Thin-gauge thermoforming is primarily the manufacture of disposable cups, containers, lids, trays, blisters, clamshells, and other products for the food, medical, and general retail industries. Thick-gauge thermoforming includes parts as diverse as vehicle door and dash panels, refrigerator liners, utility vehicle beds, and plastic pallets. Heavy-gauge forming utilizes the same basic process as continuous thin-gauge sheet forming, typically draping the heated plastic sheet over a mold. Many heavy-gauge forming applications use vacuum only in the form process, although some use two halves of mating form tooling and include air pressure to help form.

In any embodiment, a sheet comprising (or consisting essentially of) the polyethylene is fed from a roll or from an extruder into a set of indexing chains that incorporate pins, or spikes, that pierce the sheet and transport it through an oven for heating to forming temperature. The heated sheet then indexes into a form station where a mating mold and pressure-box close on the sheet, with vacuum then applied to remove trapped air and to pull the material into or onto the mold along with pressurized air to form the plastic to the detailed shape of the mold. Plug-assists are typically used in addition to vacuum in the case of taller, deeper-draw formed parts in order to provide the needed material distribution and thicknesses in the finished parts. In any case, after a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. The polyethylene sheet containing the formed parts then indexes into a trim station on the same machine, where a die cuts the parts from the remaining sheet web, or indexes into a separate trim press where the formed parts are trimmed. The sheet web remaining after the formed parts are trimmed is typically wound onto a take-up reel or fed into an inline granulator for recycling.

The inventive polyethylene compositions also find use in making injection molded articles. The injection molding process uses a ram or screw-type plunger to force molten polymer into a mold cavity; this solidifies into a shape that has conformed to the contour of the mold. It is most commonly used to process both thermoplastic and, thermosetting polymers, with the volume used of the former being considerably higher. The inventive polyethylenes are useful due to characteristics which make them highly suitable for injection molding, such as the ease with which they may be recycled, their versatility allowing them to be used in a wide variety of applications, and their ability to soften and flow upon heating. The temperature is preferably kept below the decomposition temperature of the polyethylene, preferably within a range from 140° C. to 200, or 240° C. Thermoplastics such as the polyethylenes described herein also have an element of safety over thermosets; if a thermosetting polymer is not ejected from the injection barrel in a timely manner, chemical cross-linking may occur causing the screw and check valves to seize and potentially damaging the injection molding machine.

Injection molding consists of high pressure injection of the raw material into a mold which shapes the polymer into the desired shape. Molds can be of a single cavity or multiple cavities. In multiple cavity molds, each cavity can be identical and form the same parts or can be unique and form multiple different geometries during a single cycle.

When thermoplastics such as the polyethylenes described herein are molded, typically pelletized material, preferably compounded with desirable additives such as antioxidants and alkyl-radical scavengers, is fed through a hopper into a heated barrel with a reciprocating screw. Upon entrance to the barrel the temperature increases and the molecular forces that resist relative flow of individual chains are weakened. This process reduces its viscosity, which enables the polymer to flow with the driving force of the injection unit. The screw delivers the raw material forward, mixes and homogenizes the thermal and viscous distributions of the polymer, and reduces the required heating time by mechanically shearing the material and adding a significant amount of frictional heating to the polymer. The material feeds forward through a check valve and collects at the front of the screw into a volume known as a shot. A "shot" is the volume of material that is used to fill the mold cavity, compensate for shrinkage, and provide a cushion (approximately 10% of the total shot volume, which remains in the barrel and prevents the screw from bottoming out) to transfer pressure from the screw to the mold cavity. When enough material has gathered, the material is forced at high pressure and velocity into the part forming cavity. To prevent spikes in pressure, the process normally uses a transfer position corresponding to a 95 to 98% full cavity where the screw shifts from a constant velocity to a constant pressure control. Often injection times are well under 1 second.

In any case, once the screw reaches the transfer position the packing pressure is applied, which completes mold filling and compensates for thermal shrinkage, which is quite high for thermoplastics relative to many other materials. The packing pressure is applied until the gate (cavity entrance) solidifies. Due to its small size, the gate is normally the first place to solidify through its entire thickness. Once the gate solidifies, no more material can enter the cavity. At this stage, the screw reciprocates and acquires material for the next cycle while the material within the mold cools so that it can be ejected and be dimensionally stable. This cooling duration can be reduced by the use of cooling lines circulating water or oil from an external temperature controller. Once the required temperature has been achieved, the mold opens and an array of pins, sleeves, strippers, etc., are driven forward to demold the article. Then, the mold closes and the process is repeated.

For a two shot mold, two separate materials are incorporated into one part. This type of injection molding is used to add a soft touch to knobs, to give a product multiple colors, to produce a part with multiple performance characteristics.

Injection molding is used to create many articles such as packaging, food containers, bottle caps, automotive parts and components, electronics casings, beauty care products, some musical instruments (and parts of them), one-piece chairs and small tables, storage containers, consumer goods containers for such items as moist wipes and food items, mechanical parts, and most other plastic articles available. Injection molding is ideal for producing high volumes of the same article.

In any embodiment, the articles formed from the polyethylene compositions may be cross-linked to enhance performance (such as thermal stability and durability). In any embodiment, any of these articles may be cross-linked, which can be effected by any means, including, but not limited to, chemical cross-linking (using cross-linking agents containing sulfur, peroxide, amine, halide, etc.) and radiation induced cross-linking (using radiation types such as electrons, x-rays, ions, neutrons, gamma-radiation, and ultraviolet).

The various descriptive elements and numerical ranges disclosed herein for the inventive compositions and films and articles formed therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

This invention further relates to:

1. A composition comprising at least one polyethylene having a crystallinity of less than 60% and within a range from 0.2 wt % to 15 wt % of cyclic-olefin copolymer and within a range from 0.2 wt % to 15 wt % of hydrocarbon resin, by weight of the composition.
2. The composition of paragraph 1, wherein the polyethylene has a crystallinity within a range from 30 to 60%.
3. The composition of paragraph 1 or 2, wherein the polyethylene has a density of less than 0.93 g/cm$^3$.

4. The composition of paragraph 1, 2, or 3 wherein the cyclic-olefin copolymer comprises within a range from 50 to 95 wt % cyclic-olefin monomer derived units by weight of the cyclic-olefin copolymer.

5. The composition of paragraph 1, 2, 3, or 4 wherein the cyclic-olefin copolymer has a glass transition temperature ($T_g$) of at least 70° C.

6. The composition of paragraph 1, 2, 3, 4, or 5 wherein the cyclic-olefin copolymer has a weight average molecular weight (Mw) of greater than 60,000 g/mole.

7. The composition of paragraph 1, 2, 3, 4, 5, or 6, wherein the hydrocarbon resin comprises cyclopentadiene derived units.

8. The composition of paragraph 7, wherein the hydrocarbon resin comprises dicyclopentadiene, cyclopentadiene, and methylcyclopentadiene derived units of from 60 wt % to 100 wt % of the total weight of the hydrocarbon resin, and wherein the hydrocarbon resin has a weight average molecular weight (Mw) within a range from 600 g/mole to 2000 g/mole.

9. A film comprising the composition of any of paragraphs 1 to 8.

10. A molded article comprising the composition of any of paragraphs 1 to 8.

EXAMPLES

DSC Analysis.

The heat associated with phase transitions were measured on heating and cooling the polymer samples from the solid state and melt, respectively, using a Perkin Elmer DSC. The data were analyzed using the analysis software provided by the vendor. An amount of 3 to 6 mg of polymer was placed in an aluminum pan and loaded into the instrument at room temperature. The sample was cooled to −40° C. and held for 10 minutes, and then heated to 180° C. and held for 10 minutes, both at a cooling/heating rate of 10° C./min to evaluate the melting behavior. Areas under the second melt DSC trace were used to determine the heat of fusion ($\Delta H_f$). The percent crystallinities in Table 1 were calculated by taking the measured heats of fusion ($\Delta H_f$) and divide by the heat of fusion for 100% crystalline polyethylene, which was taken to be 293 J/g as found in the literature, then multiplied by 100.

Bag Drop Test.

This is a test that simulates extreme end-use handling conditions in controlled manner and is based on ASTM D2463 and 5276-98, using a "staircase" method. The instrument used was a drop impact tester: IPT Model 1509 (Institut für Prüftechnik) to evaluate impact resistance of bags filled with pellets after free fall from 6 meters high. Bags filled with 1 kg of solid powder (calcium carbonate masterbatch: PB White 8860) were made with a film width of 345 mm for heat sealing or 335 mm width for impulse sealing. Bag width is than 160 mm and the bag length is between 180-200 mm, and conditions for 24 hours at 23° C. A Vertical Form Fill & Seal (VFFS) machine was used to assemble the bags. Thus, the bag fill material was PB White 8860, with a weight per bag of 1 kg, the bags sealed using an impulse sealer with no puncture or perforation. The drop position of the bag was placed as like that the seams are not facing down to the platform on which the bag drops. In this way, the pressure goes to the longitudinal seam and the side seams, which is most likely place to have failure. Results of the test are in Table 4 on bags made from films described in the Examples below.

Melt Index.

ASTM D1238 using 2.16 kg, 190° C.

Melt extruded blends were formed from the polyethylenes (PE1, PE2, and PE3) in Table 1 with a masterbatch (MB) of 30 wt %, by weight of the MB, of Oppera™ PR100N (138° C. s.p.) (HCR) and 70 wt % Topas™ 5013F-04 (78 wt % norbornene; melt index (190° C./2.16 kg)<0.1 g/10 min; Mn=50 kg/mole, Mw=100 kg/mol) (COC). Some films were made for comparison purposes (2C, 6C, and 10C) as a blend of just Topas™ 5013F and the PE's in Table 1. All were blended in the proportions outlined in Table 2 and formed into blown films in an Alpine blown film line, where 50 μm average thickness films were formed.

In forming the films of Table 2, the thickness (2 sigma) varied by 5, 20 and 30% as the amount of COC when from 0 wt % to 10 wt %. The extruder temperature was about 180° C. in the grooved feed zone, and about 200° C. in the final extruder segment when making films. Other typical parameters are outlined in Table 3 in Film preparation. Films from PE3 were clear while films from PE1 and PE2 were more hazy, having an appearance of hazy, less homogeneous, dispersed regions/islands.

TABLE 1

Polyethylene Grade Crystallinity in the Examples

| crystallinity | Enable ™ 3505HH PE1 | Enable ™ 2705HH PE2 | Exceed ™ XP 6026 PE3 |
|---|---|---|---|
| $\Delta H_f$ (measured) J/g | 164.4 | 145.6 | 121.4 |
| $\Delta H_f$ (literature) J/g | 293 | 293 | 293 |
| wt % crystallinity | 56.1% | 49.7% | 41.4% |
| wt % amorphous | 43.9% | 50.3% | 58.6% |

TABLE 2

Compositions of 50 μm thickness blown films (wt %)

| Film # | PE1 | PE2 | PE3 | COC-HCR MB | Added COC | Amounts (COC/HCR) |
|---|---|---|---|---|---|---|
| 1C | — | 100 | — | — | — | — |
| 2C | — | 90 | — | — | 7 | 7/0 |
| 3 | — | 95 | — | 5 | — | 3.5/1.5 |
| 4 | — | 90 | — | 10 | — | 7/3 |
| 5C | 100 | — | — | — | — | — |
| 6C | 90 | — | — | — | 7 | 7/0 |
| 7 | 95 | — | — | 5 | — | 3.5/1.5 |
| 8 | 90 | — | — | 10 | — | 7/3 |
| 9C | — | — | 100 | — | — | — |
| 10C | — | — | 90 | — | 7 | 7/0 |
| 11 | — | — | 95 | 5 | — | 3.5/1.5 |
| 12 | — | — | 90 | 10 | — | 7/3 |

TABLE 3

Typical Film Making Conditions

| | | PE2 | PE3 | 90 wt % PE3 + 10 wt % COC |
|---|---|---|---|---|
| Melt Temperatures | (° C.) | | | |
| t 1 | | 210 | 236 | 230 |
| t 2 | | 217 | 259 | 250 |
| t 3 | | 223 | 272 | 261 |

TABLE 3-continued

Typical Film Making Conditions

| | | PE2 | PE3 | 90 wt % PE3 + 10 wt % COC |
|---|---|---|---|---|
| t 4 | | 218 | 261 | 252 |
| t 5 | | 210 | 236 | 230 |
| t melt | | 202 | 222 | 217 |
| Melt Pressures | (bar) | | | |
| p 1 | | 145 | 16 | 26 |
| p 2 | | 220 | 29 | 57 |
| p 3 | | 321 | 178 | 206 |
| p 4 | | 388 | 366 | 346 |
| p 5 | | 484 | 570 | 526 |
| p 6 | | 297 | 377 | 339 |
| Die diameter | (mm) | 200 | 200 | 200 |
| Die gap | (mm) | 1.5 | 1.5 | 1.5 |
| Screw speed | (rpm) | 55 | 76 | 71 |
| Screw yield | | 2.162 | 1.579 | 1.695 |
| Motor load | (A) | 135 | 125 | 135 |
| Output | (kg/h) | 119 | 120 | 121 |
| Lay Flat Width | (mm) | 779 | 799 | 791 |
| Frost Line Height | (mm) | 600 | 600 | 600 |
| Haul-off speed | (m/min) | 27.4 | 27.9 | 27.8 |
| Thickness | (μm) | 50.46 | 49.23 | 49.74 |
| Tolerance 2 σ | (%) | 8.3 | 7.8 | 10.6 |
| Profile Tolerance +2 σ | (%) | 11.6 | 8.2 | 13.5 |
| Profile Tolerance −2 σ | (%) | −8.5 | −9.4 | −16.3 |
| Cooling air temperature | (° C.) | 55.3 | 48.9 | 51.8 |
| Pressure cooling ring | (mbar) | 7 | 10 | 24 |
| Blowers Cooling | (Hz. Max 50) | 32 | 40 | 40 |
| Water temperature In | (° C.) | 16 | 16 | 16 |
| Out | (° C.) | 19 | 18 | 20 |
| Sample width | (mm) | 340 | 340 | 340 |
| Sample length | (m) | 200 | 200 | 200 |
| Specific output | (kg/h/rpm) | 55.4 | 76.5 | 71.4 |
| Output/cm die | (kg/h/cm) | 1.91 | 1.92 | 1.93 |
| Shear rate | (s$^{-1}$) | 186 | 188 | 188 |
| Draw-up ratio | | 73.7 | 77.5 | 76.0 |
| B.U.R. | | 2.48 | 2.54 | 2.52 |
| LFW − BUR | | 785 | 785 | 785 |

TABLE 4

Drop Testing for bags made from films

| Bag made from film # | W0 | dW | A | N | WF (lbs) | B | std dev | breakage |
|---|---|---|---|---|---|---|---|---|
| 9C | 2.5 | 0.5 | 9 | 10 | 2.7 | 13 | 0.420 | 3LPO |
| 10C | 2 | 0.5 | 9 | 10 | 2.2 | 17 | 0.744 | 3LPO |
| 11 | 6 | 0.5 | 0 | 10 | >6 | 0 | 0.024 | No break |
| 12 | 6 | 0.5 | 0 | 10 | >6 | 0 | 0.024 | No break |

Drop tests were performed on bags made from monolayered films 9C, 10C, 11, and 12. In Table 4, "3LPO" means that 3-layer point opens when the bag drops. WF=impact failure weight (value to report as dart drop); W0=weight to which an i value of zero is assigned; dW=the dart weight increment (decrement) used; and A=sum i×$n_i$; N=sum $n_i$; and B=sum I$^2$×$n_i$.

With respect to a polyolefin, composition and/or article such as a film, "consisting essentially of" means that the claimed polyolefin, composition and/or article includes the named components and no additional components that will alter its measured properties by any more than ±1, 2, 5, or 10%, and most preferably means that "additives" are present, if at all, to a level of less than 5, or 4, or 3, or 2 wt % by weight of the composition. Such additional additives can include, for example, inorganic fillers (such as talc, glass, and other minerals), carbon black, nucleators, clarifiers, colorants (soluble and insoluble), foaming agents, antioxidants, alkyl-radical scavengers (preferably vitamin E or other tocopherols and/or tocotrienols), anti-ultraviolet light agents, acid scavengers, curatives and cross-linking agents, mineral and synthetic oils, and other additives well known in the art.

For all jurisdictions in which the doctrine of "incorporation by reference" applies, all of the test methods, patent publications, patents and reference articles are hereby incorporated by reference either in their entirety or for the relevant portion for which they are referenced.

We claim:

1. A composition comprising:
    linear low density polyethylene having a density of 0.93 g/cm$^2$ or less and a crystallinity of less than 60%;
    0.2 wt % to 15 wt %, based upon the weight of the composition, of cyclic-olefin copolymer comprising 50 wt % or more of cyclic olefin monomer derived units, and having a weight average molecular weight (Mw) of greater than 60,000 g/mole; and
    0.2 wt % to 15 wt %, based upon the weight of the composition, of hydrocarbon resin, comprising cyclopentadiene derived units.

2. The composition of claim 1, wherein the polyethylene has a crystallinity within a range from 30 to 60%.

3. The composition of claim 1, wherein the polyethylene has a density of 0.90 to 0.925 g/cm$^3$.

4. The composition of claim 1, wherein the cyclic-olefin copolymer comprises within a range from 50 to 95 wt % cyclic-olefin monomer derived units by weight of the cyclic-olefin copolymer.

5. The composition of claim 1, wherein the cyclic-olefin copolymer has a glass transition temperature ($T_g$) of at least 70° C.

6. The composition of claim 1, wherein the cyclic-olefin copolymer has a weight average molecular weight (Mw) of greater than 60,000 to 600,000 g/mole.

7. The composition of claim 1, wherein the cyclopentadiene derived units are dicyclopentadiene derived units.

8. The composition of claim 1, wherein the hydrocarbon resin comprises dicyclopentadiene, cyclopentadiene, and methylcyclopentadiene derived units of from 60 wt % to 100 wt % of the total weight of the hydrocarbon resin, and wherein the hydrocarbon resin has a weight average molecular weight (Mw) within a range from 600 g/mole to 2000 g/mole.

9. A film comprising a composition comprising:
    linear low density polyethylene having a density of 0.93 g/cm$^2$ or less and a crystallinity of less than 60%;
    0.2 wt % to 15 wt %, based upon the weight of the composition, of cyclic-olefin copolymer comprising 50 wt % or more of cyclic olefin monomer derived units; and
    0.2 wt % to 15 wt %, based upon the weight of the composition, of hydrocarbon resin, comprising cyclopentadiene derived units.

10. A molded article comprising a composition comprising:
    linear low density polyethylene having a density of 0.93 g/cm$^2$ or less and a crystallinity of less than 60%;
    0.2 wt % to 15 wt %, based upon the weight of the composition, of cyclic-olefin copolymer comprising 50 wt % or more of cyclic olefin monomer derived units; and
    0.2 wt % to 15 wt %, based upon the weight of the composition, of hydrocarbon resin, comprising cyclopentadiene derived units.

11. The composition of claim 1, wherein the linear low density polyethylene has density of 0.90 g/cm³ to 0.925 g/cm³, a melt index (190° C., 2.16 kg) of 0.20 to 10.0 g/10 min, and an Mw/Mn of 1.8 to 4.0.

12. The composition of claim 1, wherein the linear low density polyethylene is produced using a metallocene-type catalyst.

13. The composition of claim 1, wherein the cyclic olefin monomer derived units are selected from norbornenes, tetracyclododecene, and substituted versions thereof.

14. The composition of claim 1, wherein the hydrocarbon resin is a polymer or oligomer produced by the polymerization of cyclopentadiene or substituted cyclopentadiene, which optionally further includes aliphatic or aromatic monomers.

15. The composition of claim 1, wherein the hydrocarbon resin has a melt viscosity of from 300 to 800 centipoise (cPs) at 160° C.

16. The composition of claim 1, wherein the cyclic olefin derived units are selected from $C_5$ to $C_{20}$ olefins comprising at least one $C_5$ to $C_8$ cyclic structure.

17. The film of claim 9, wherein the film is multilayered and at least one core layer of the multi-layered film extrudes at a melt temperature at the die of 240° C. or less, a melt pressure of 45, MPa or less, a die factor from 0.6 to 1 kg/mm die diameter/hr, and a specific output of 2.8 to 3.2 kg/h/rev.

18. A composition consisting essentially of:
at least one linear low density polyethylene having a density of 0.93 g/cm² or less and a crystallinity of less than 60%;
0.2 wt % to 15 wt %, based upon the weight of the composition, of cyclic-olefin copolymer comprising 50 wt % or more of cyclic olefin monomer derived units, and having a weight average molecular weight (Mw) of greater than 60,000 g/mole; and
0.2 wt % to 15 wt %, based upon the weight of the composition, of hydrocarbon resin comprising cyclopentadiene derived units.

19. The composition of claim 18, wherein the hydrocarbon resin has a melt viscosity of from 300 to 800 centipoise (cPs) at 160° C.

20. The composition of claim 18, wherein:
the hydrocarbon resin has:
1) a melt viscosity of from 350 to 650 centipoise (cPs) at 160° C.,
2) a dicyclopentadiene derived content of 50 wt % to 100 wt % of the total weight of the hydrocarbon resin,
3) a Mw of from 600 to 2,000 g/mole;
4) an Mn of from 300 to 800 g/mole, and
5) a glass transition temperature ($T_g$) of 0 to 100° C.; and
the linear low density polyethylene is a copolymer comprising ethylene and at least 80% $C_3$ to $C_{10}$ α-olefins and has:
i) a melt index (190° C., 2.16 kg) of 0.20 to 10.0 g/10 min,
ii) a density of 0.90 g/cm³ to 0.925 g/cm³, and
iii) optionally, an Mw/Mn of 1.8 to 4.0; and
the cyclic olefin copolymer has:
a) a glass transition temperature ($T_g$) of at least 70° C.;
b) a weight average molecular weight (Mw) of greater than 80,000 g/mol,
c) a number average molecular weight (Mn) of greater than 30,000 g/mol,
d) 50 to 95 wt % cyclic-olefin monomer derived units, based upon the weight of the cyclic-olefin copolymer, and
e) cyclic olefin monomer derived units selected from norbornenes, tetracyclododecene, and substituted versions thereof.

\* \* \* \* \*